United States Patent [19]
Allen et al.

[11] Patent Number: 5,999,316
[45] Date of Patent: Dec. 7, 1999

[54] LIGHT VALVE WITH ROTATING POLARIZING ELEMENT

[75] Inventors: Richard C. Allen, Mendota Heights; Gregg A. Hietpas, St. Paul; Jon E. Stickrod, Oakdale; John A Wheatley, Lake Elmo, all of Minn.

[73] Assignee: 3M Innovative Properties Company, St. Paul, Minn.

[21] Appl. No.: 08/986,281

[22] Filed: Dec. 6, 1997

[51] Int. Cl.$^6$ ..................................................... G02B 5/30
[52] U.S. Cl. ........................ 359/501; 359/493; 359/601; 296/97.1
[58] Field of Search .................................. 359/229, 493, 359/501, 601; 296/97.1, 97.2

[56] References Cited

U.S. PATENT DOCUMENTS

| | | | |
|---|---|---|---|
| 2,102,632 | 12/1937 | Land | 359/493 |
| 2,311,840 | 2/1943 | Land | 359/501 |
| 2,423,322 | 7/1947 | Hurley, Jr. | 359/493 |
| 2,617,329 | 11/1952 | Dreyer. | |
| 3,663,089 | 5/1972 | Makas. | |
| 4,123,141 | 10/1978 | Schuler | 350/159 |
| 4,285,577 | 8/1981 | Schuler | 350/403 |
| 4,353,593 | 10/1982 | Henson | 296/97 D |
| 4,364,375 | 12/1982 | Younghouse | 126/444 |
| 4,509,825 | 4/1985 | Otto et al. | 350/259 |
| 4,540,241 | 9/1985 | Rivier | 350/261 |
| 4,746,162 | 5/1988 | Maness | 296/97 R |
| 4,773,733 | 9/1988 | Murphy, Jr. et al. | 350/260 |
| 4,902,112 | 2/1990 | Lowe | 350/396 |
| 5,033,829 | 7/1991 | Faroughy | 350/396 |
| 5,135,279 | 8/1992 | Beatty | 296/97.1 |
| 5,164,856 | 11/1992 | Zhang et al. | 359/489 |
| 5,467,266 | 11/1995 | Jacobs et al. | 364/167.01 |
| 5,564,771 | 10/1996 | Chesters | 296/97.5 |
| 5,608,990 | 3/1997 | Kyle | 49/38 |
| 5,663,621 | 9/1997 | Popat | 318/480 |
| 5,686,979 | 11/1997 | Weber et al. | 349/96 |

FOREIGN PATENT DOCUMENTS 2 270 104  3/1994  United Kingdom.

*Primary Examiner*—Cassandra Spyrou
*Assistant Examiner*—Darren E. Schuberg
*Attorney, Agent, or Firm*—David B. Patchett

[57] ABSTRACT

The present invention provides light valves including polarizing elements in which light transmission can be controlled by rotating at least one of the polarizing elements about an in-plane axis. Although reflective polarizing elements are preferred in devices according to the present invention to reduce the problem of heat build-up, the use of absorptive or other polarizers may also be envisioned. The light valves according to the present invention may find use in any application in which the transmission of light (visible or otherwise) is to be controlled. Examples of specific applications include, but are not limited to: windows, luminaires, skylights, etc.

22 Claims, 14 Drawing Sheets

5,999,316

LIGHT VALVE WITH ROTATING POLARIZING ELEMENT

FIELD OF THE INVENTION

The present invention relates to the field of light control devices and methods. More particularly, the present invention provides light valves which use one or more polarizing elements that rotate about an in-plane axis to control the passage of light through the device.

BACKGROUND OF THE INVENTION

Manual control of light transmission is generally required for many purposes, including industrial, commercial, and residential applications. One common application is the control of light passing through a window, skylight, or other opening for a variety of reasons, e.g., controlling visible light transmission, ensuring privacy, reducing heat build-up in a room, etc. Many types of curtains, venetian blinds, shades, draperies, shutters, and the like are used to control the amount of light admitted into a room or building through a window, skylight, or other opening.

In many cases, the devices used as light valves are totally or partially opaque and function by absorbing incident light. Because the light is absorbed by the devices, they typically convert light energy into heat, which can then be radiated into the building or space in which the devices are located. In addition, while some of the devices, e.g., venetian blinds and shutters, are effective at ensuring privacy, they may also excessively restrict the view through the window.

The use of polarizers as light valves in many different applications is wellknown. Typically, two polarizers are used, at least one of which can be translated or rotated. In general, the transmission axis of the front polarizer is "crossed" with the transmission axis of the rear polarizer at angles that can vary between 0 and 90° to adjust the amount of light transmitted through the polarizers. The rotation is typically about an axis that is normal to the plane in which the polarizer is located, i.e., the axis of rotation is out of the plane in which the rotating polarizer is located. As a result, the rotating light valves typically require that the window or other opening in which they are placed be generally circular. In other words, such devices are not particularly useful for windows which have a generally square or rectangular outline.

Other approaches at controlling light transmission through a window include the use of privacy films, such as those described in U.S. Pat. No. 5,686,979 (Weber et al.). Such privacy films use an electronically switched columnar dispersed liquid crystal film that provides reversible opacity with or without mechanical movement.

In addition, although the use of polarization to control the transmission of light has been discussed in many different manners, most of the discussions focus on the use of absorptive polarizers. Typically, absorptive polarizers use dichroic dyes which absorb light of one polarization orientation more strongly than that of the orthogonal polarization orientation. Because absorptive polarizers absorb light having one polarization orientation, they can also present the problems of conversion of absorbed solar energy into thermal energy which is then radiated into the interior of a room.

As a result, a need exists for a light valve that can a) control the amount of light passing through an opening, b) provide high contrast between its open and closed states, c) provide for absorption or reflection to improve energy efficiency, and/or d) provide control over viewing angle to either limit or expand viewing angles.

SUMMARY OF INVENTION

The present invention provides light valves including polarizing elements in which light transmission can be controlled by rotating at least one of the polarizing elements about an in-plane axis. Although reflective polarizing elements are preferred in devices according to the present invention to reduce the problem of heat build-up, the use of absorptive or other polarizers may also be envisioned.

The light valves according to the present invention may find use in any application in which the transmission of light (visible or otherwise) is to be controlled. Examples of specific applications include, but are not limited to: windows, luminaires, skylights, etc.

In one aspect, the present invention provides a light valve including a first polarizing element having a first transmission axis; and a second polarizing element having an axis of rotation and a second transmission axis intersecting the axis of rotation at an angle of about 45 degrees; wherein rotation of the second polarizing element about the axis of rotation to a first orientation generally aligns the first and second transmission axes and rotation of the second polarizing element about the axis of rotation to a second orientation causes the first transmission axis to cross the second transmission axis, whereby transmission of light traveling through the first and second polarizing elements is reduced relative to the light transmitted through the first and second polarizing elements when in the first orientation.

In another aspect, the present invention provides a light valve having a first polarizing element including a reflective polarizer having a first transmission axis; and a plurality of second polarizing elements, each of the second polarizing elements including an axis of rotation about which the second polarizing element rotates and a reflective polarizer having a second transmission axis that forms an angle of about 45 degrees with the axis of rotation of the second polarizing element, the axes of rotation of the plurality of second polarizing elements being generally parallel to each other; wherein the first transmission axis of the first polarizing element forms an angle of about 45 degrees with the axes of rotation of the plurality of second polarizing elements, and further wherein rotation of each of the second polarizing elements about its respective axis of rotation to a first orientation generally aligns the second transmission axis of the second polarizing element with the first transmission axis, and further wherein rotation of each of the second polarizing elements about 180 degrees around its respective axis of rotation to a second orientation causes the second transmission axis to cross the first transmission axis, whereby transmission of light traveling through the first and second polarizing elements is reduced relative to the light transmitted through the first and second polarizing elements when in the first orientation.

In another aspect, the present invention provides a light valve including a first polarizing element having a first axis of transmission and a first axis of rotation, wherein the first axis of transmission and the first axis of rotation define a first plane for the first polarizing element; and a second polarizing element having a second axis of transmission and a second axis of rotation, wherein the second axis of transmission and the second axis of rotation define a second plane for the second polarizing element, and further wherein at least a portion of the second polarizing element overlaps at least a portion of the first polarizing element; wherein the first and second transmission axes of the first and second polarizing elements are generally aligned in a first orientation, and further wherein rotation of the first and second polarizing elements about their respective axes of rotation to a second orientation causes the second transmission axis to cross the first transmission axis, whereby transmission of light traveling through the first and second polarizing elements is reduced relative to the light transmitted through the first and second polarizing elements when in the first orientation.

In another aspect, the present invention provides a light valve including a plurality of polarizing elements, at least a portion of each of the polarizing elements having a first transmission axis or a second transmission axis, wherein the portions of the polarizing elements having the first transmission axis transmit a substantial portion of light having a first polarization orientation and the portions of the polarizing elements having the second transmission axis transmit a substantial portion of light having a second polarization orientation, the plurality of polarizing elements including: a first polarizing element having the first axis of transmission and a first axis of rotation, wherein the first axis of transmission in the first polarizing element intersects the first axis of rotation; a second polarizing element including an upper segment having the first transmission axis, a lower segment having the second transmission axis, and a second axis of rotation, wherein the first and second transmission axes in the second polarizing element intersect the second axis of rotation and each other, and further wherein at least a portion of the second polarizing element overlaps at least a portion of the first polarizing element; a third polarizing element having the first axis of transmission and a third axis of rotation, wherein the first axis of transmission in the third polarizing element intersects the third axis of rotation, and further wherein at least a portion of the third polarizing element overlaps at least a portion of the second polarizing element; and a fourth polarizing element including an upper segment having the first transmission axis, a lower segment having the second transmission axis, and a fourth axis of rotation, wherein the first and second transmission axes in the fourth polarizing element intersect the fourth axis of rotation and each other, and further wherein at least a portion of the fourth polarizing element overlaps at least a portion of the third polarizing element; wherein rotation of the first, second, third, and fourth polarizing elements about their respective axes of rotation to a first orientation generally aligns the first and second transmission axes in each of the overlapping portions of the first, second, third, and fourth polarizing elements, and further wherein rotation of the first, second, third, and fourth polarizing elements about their respective axes of rotation to a second orientation causes the first and second transmission axes in each of the overlapping portions of the first, second, third, and fourth polarizing elements to cross, whereby transmission of light traveling through the first, second, third, and fourth polarizing elements when in the second orientation is reduced relative to the light transmitted through the first, second, third, and fourth polarizing elements when in the first orientation.

These and other features and advantages of the invention are more fully shown and described in the drawings and detailed description of this invention.

DETAILED DESCRIPTION OF ILLUSTRATIVE EMBODIMENTS OF THE INVENTION

Figure 1:
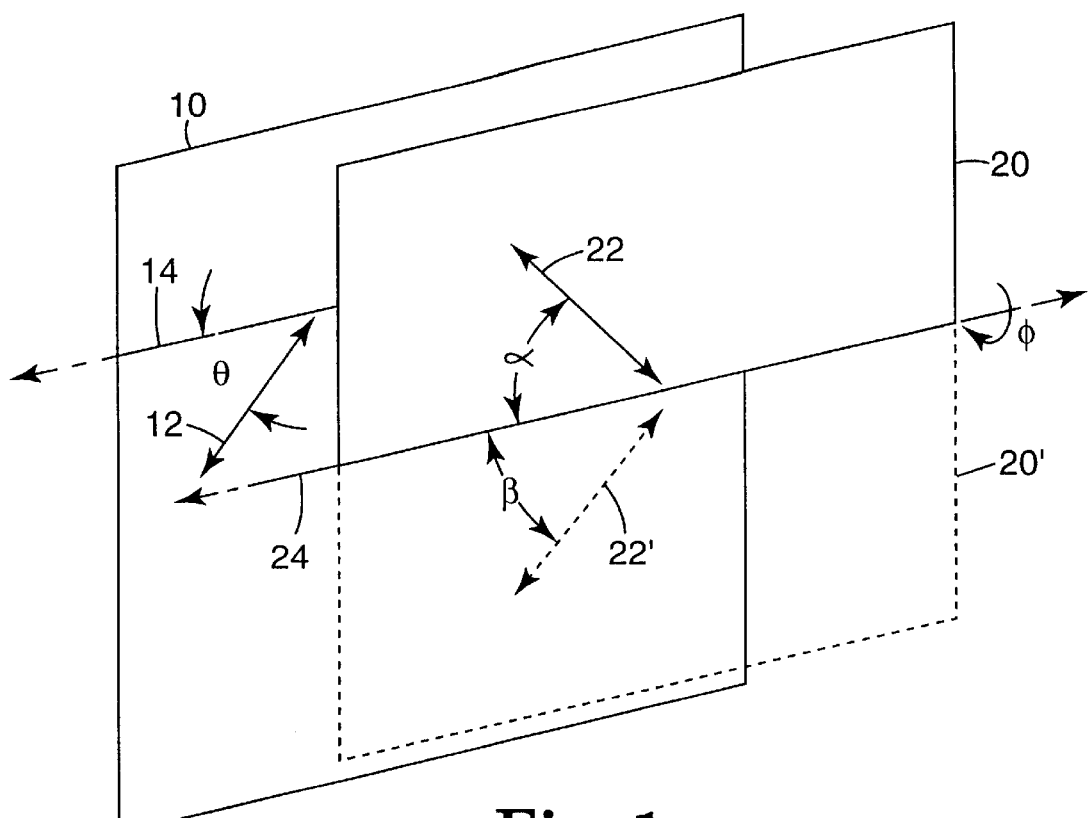
FIG. 1 is a perspective view of one light valve according to the present invention.

Briefly, the present invention provides light valves for controlling the transmission of light through an opening in which one or both of two polarizing elements are rotated about in-plane axes of rotation. The light valves according to the present invention may find use in applications such as control of light passing through windows (e.g., as horizontal blinds such as venetian blinds, vertical blinds, shutters, etc.), in luminaires to control the distribution of light from a light fixture, or they may find use in other applications such as optical systems in industrial, commercial, or other settings.

The plane of the polarizing elements is defined by the transmission axis and the axis of rotation about which the polarizing element is rotated. Where the polarizing element is non-planar, it will be understood that the transmission axis can be projected into a plane and it is that plane in which the axis of rotation is also located, thereby providing for the in-plane axis of rotation that forms a part of the present invention. In other words, the axis of rotation, although typically extending through the body of the polarizing element, may not lie in the physical body of the polarizing element.

Although the illustrative embodiments discussed below are described as using "front" and "rear" polarizing elements, those terms are used only to facilitate an understanding of the invention and should not be construed as limiting the orientation of the light valves according to the present invention in any particular application.

The effect of the illustrative light valves on incident light as described below, i.e., the incident light can be transmitted or blocked, generally assumes that the incident light is approaching normal to the light valves. Those skilled in the art will, however, understand that when using any polarizing element, the performance of the polarizing elements in the light valves with off-axis light (i.e., light approaching the light valve off the normal axis) may also need to be considered. In addition, the performance of the light valves in terms of amounts of incident light transmitted or blocked generally ignores the effects of surface reflections in the light valves to simplify the discussions.

In those embodiments in which one of the polarizing elements is stationary, i.e., is not rotated, the transmission axes of the polarizing elements are preferably oriented at an angle of about 45° with respect to the axis of rotation of the rotating polarizing element. As a result, rotation of one of the polarizing elements about the axis of rotation to a first orientation results in alignment of the transmission axes of the front and rear polarizing elements. By aligning the transmission axes, light having that polarization orientation can pass through the polarizing elements. Alternately, 180 degree rotation of one of the polarizing elements to a second polarization orientation results in orthogonal orientation of the two transmission axes. That "crossing" of the axes of transmission will result in reflection and/or absorption of substantially all incident light directed through the front and rear polarizing elements.

In other embodiments of light valves, according to the present invention, the 45° orientation of transmission axes is not required to effect a change between a light valve which transmits incident light to a light valve which is substantially opaque to incident light. In those embodiments, it is typically required that both of the polarizing elements be rotated about in-plane axes of rotation to effect the change between transmission and opacity in the light valve.

It should be understood that although the discussion below will contrast states of light valves between transmission and opacity, open and closed, transmitting and blocking, etc., such terms are relative. Furthermore, it may be desired to orient the various axes of transmission such that at no time is substantially all incident light reflected or blocked from transmission through the light valves, according to the present invention. It may, rather, be desired only to attenuate the transmission of light through an opening and, in those instances, the axes of transmission of the front and rear polarizing elements may form angles that are between 0 and 90° with respect to each other to allow transmission of a portion of the light when the light valve is in the closed or blocking state.

Light valves according to the present invention can use a variety of polarizing materials in the polarizing elements. Examples of suitable polarizing element materials include sheets, films, coatings, etc., such as those described in, e.g., copending and commonly assigned U.S. patent application Ser. No. 08/402,042 (now abandoned) (filed Mar. 10, 1995); U.S. Pat. No. 5,882,774 (issued Mar. 16, 1999), and U.S. Pat. No. 5,825,543 (issued Oct. 20, 1998). Although many of these polarizing materials are typically referred to as reflective polarizers in which light that is not transmitted is typically reflected, it will be understood that the present invention may use other polarizing materials or structures that prevent or reduce the transmission of light having one polarization orientation. Examples of absorptive polarizing materials, coatings or structures include, but are not limited to dichroic dyes. It should be understood that, for the purposes of the present invention, the composition of the polarizing materials is not important. Rather, it is the functional performance of the polarizing materials that is important, i.e., that they preferentially absorb or reflect (specularly or diffusely) light having one polarization orientation.

FIG. 1 is a perspective view of one illustrative light valve, according to the present invention, including a front polarizing element 10 and a rear polarizing element 20. Front polarizing element 10 has a transmission axis 12, as shown in FIG. 1. Also shown in FIG. 1 is a reference axis 14 and angle θ which is formed between the transmission axis 12 and reference axis 14.

Rear polarizing element 20 is preferably rotated about axis of rotation 24 which is preferably generally parallel to reference axis 14 of polarizing element 10. Rear polarizing element 20 includes an axis of transmission 22 that forms an angle α with the axis of rotation 24. Transmission axis 22 and axis of rotation 24 preferably lie in the plane of rear polarizing element 20. As a result, rotation of rear polarizing element 20 about axis of rotation 24 results in location of rear polarizing element 20 below axis of rotation 24, as indicated by reference numeral 20'. Rotation of rear polarizing element 20 also results in a mirroring of the transmission axis 22 about axis of rotation 24 to a position indicated by reference numeral 22'. As a result, the axis of transmission 22' forms an angle β with the axis of rotation 24, as best seen in FIG. 1.

Figure 2:
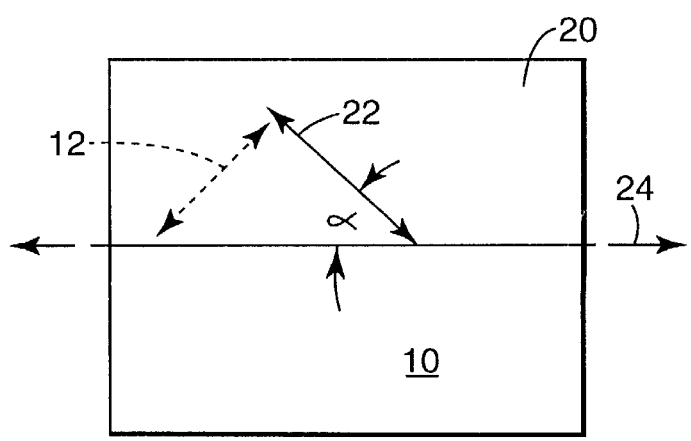
FIG. 2 is a plan view of the light valve of FIG. 1.

It is preferred that the angles θ, α, and β formed between their respective axes of transmission in reference axes are about 45°. By providing the transmission axes with those orientations, the light valve depicted in FIG. 1 can be opened or closed by rotating rear polarizing element 20 about axis of rotation 24. Referring to FIG. 2, which is a plan view of the light valve of FIG. 1, it can be seen that transmission axis 12 of the front polarizing element 10 forms approximately a 90° angle with the transmission axis 22 of rear polarizing element 20. By orienting the axes of transmission 12 and 22 generally orthogonal to each other, a minimum amount of light will be transmitted through the upper half of light valve depicted in FIG. 1, i.e., the light valve will be in the opaque condition.

Figure 3:
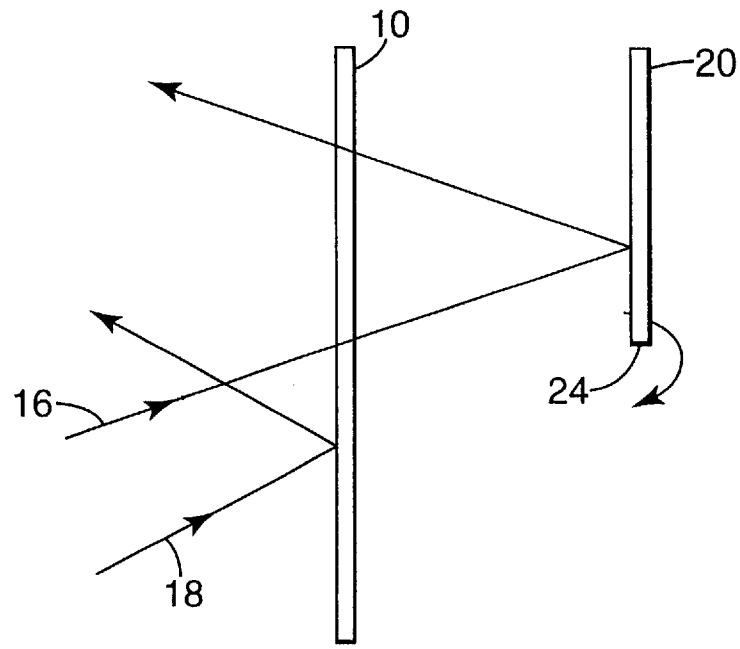
FIG. 3 is a side view of the light valve of FIG. 1 taken along the axis of rotation 24.

FIG. 3 is a side view of the light valve of FIGS. 1 and 2 taken along the axis of rotation 24. This view depicts the effects on light of the light valve when in the state depicted in FIGS. 1 and 2, where the rear polarizing element 20 is located above axis of rotation 24. Light 16 having one polarization orientation is depicted as being transmitted through the front polarizer 10 where it strikes rear polarizer 20. Because light 16 has a polarization orientation that is transmitted through polarizing element 10, it is not transmitted through rear polarizing element 20. Instead, light 16 is reflected from the preferred reflective polarizer of rear polarizing element 20 where it is transmitted back through front polarizing element 10 (assuming its polarization orientation is unchanged). It will, of course, be understood that if rear polarizing element 20 were an absorptive polarizer, light 16 would merely be absorbed by the rear polarizing element 20.

Light 18, which is depicted in FIG. 3 as incident upon front polarizing element 10, is not transmitted through but is, instead, depicted as being reflected from front polarizing element 10 because it has a polarization orientation that is orthogonal to the axis of transmission 12 seen in FIGS. 1 and 2. Again, although it is preferred that front polarizing element 10 be a reflective polarizer, it may also be provided as an absorptive polarizer in which case light 18 would be absorbed by front polarizing element 10. The result is that the front and rear polarizing elements 10 and 20 prevent the transmission of substantially all of the light incident on them because the axes of transmission 12 and 22 are oriented substantially orthogonal to each other.

Figure 4:
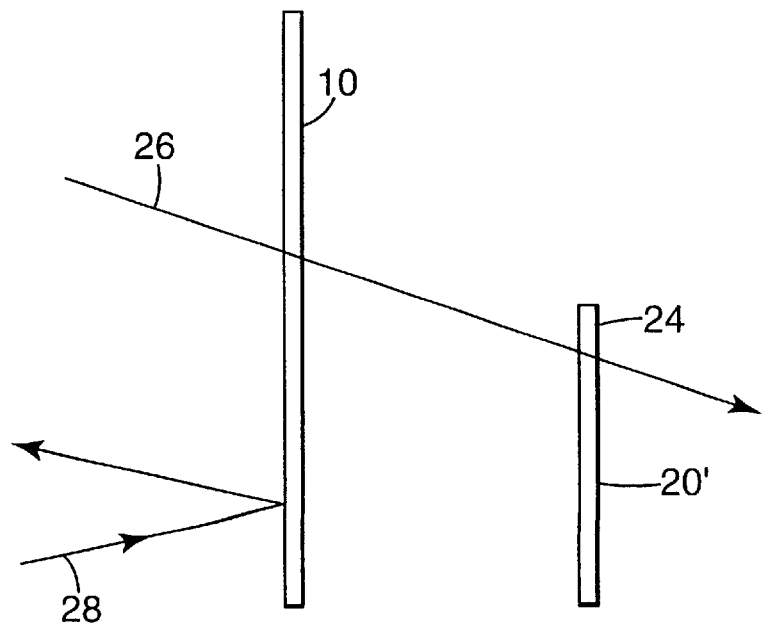
FIG. 4 is a side view of the light valve of FIG. 1 taken along the axis of rotation 24, with the second polarizing element 20' in a lower position.

FIG. 4 is a side view of the light valve of FIG. 1 in which the rear polarizer is depicted in the lower position 20' where the axis of transmission 22' is generally aligned with axis of transmission 12 of the front polarizing element 10. Light 26 having a polarization orientation that is generally aligned with the axis of transmission 12 of front polarizing element 10 is transmitted through the front polarizing element 10 and, because the axis of transmission 22' is aligned with axis of transmission 12, light 26 is also transmitted through the rear polarizing element 20'. Light 28 having an orthogonal polarization orientation to that of light 26 is depicted as being reflected from the surface of front polarizing element 10 (which is preferably, but not necessarily, a reflective polarizer). Because the light valve transmits light having the polarization orientation of light 26, the light valve is considered to be in the transmissive or open state in FIG. 4 (although it will be understood that only about half of the incident light will actually be transmitted due to the polarizing function of the polarizing elements 10 and 20.

Although FIGS. 1–4 depict a light valve in which a front polarizing element 10 is paired with a single rear polarizing element 20, it will be understood that a plurality of rear polarizing elements 20 could be provided in the form of a venetian blind or other similar assembly such that rotation of each element 20 about its respective axis of rotation would result in a change in the amount of light transmitted through the light valve. In such an application, it would be preferred that the front polarizing element 10 be provided as a single sheet or film of polarizing material that could be laminated to window glass, etc. Alternatively, front polarizing element 10 could be provided in the form of a shade or other article which could be placed between the window or other opening and the rear polarizing elements 20. If the front polarizing element were removable or movable, the user could raise both front polarizing element 10 and rear polarizing element 20 out of the path of incident light coming through a window or other opening to prevent the polarizing elements 10 and 20 from interfering with the transmission of light through the window or other opening.

If the user desired only to attenuate a portion of the light incident on the window or other opening, front polarizing element 10 could be lowered into place, which would result in limiting the transmission to approximately 50% of incident light, i.e., that light having a polarization orientation generally aligned with axis of transmission 12 in FIG. 1. In addition to reducing the intensity of the transmitted light, another potential advantage is that the front polarizing element may reduce glare caused by light passing through, e.g., a window. Where further reduction in the transmission of light through the window or other opening was desired, rear polarizing element 20 or elements 20 could be lowered and placed in the positions depicted in FIGS. 1–3 to prevent substantially all of incident light from passing through the light valve. Alternately, the rear polarizing elements could be rotated about their respective axes of rotation to allow approximately 50% of incident light to pass through the light valve including front polarizing element 10 and rear polarizing element 20 or elements 20.

Although the axes of transmission for the front polarizing element 10 and rear polarizing element 20 are preferably about 45° off of the axis of rotation 24 about which rear polarizing element 20 is rotated, it will be understood that transmission axes with other orientations could be provided. Deviations from the preferred 45° angular orientation will result in transmission of at least some light when the front and rear polarizing elements 10 and 20 are located such that their axes of transmission 12 and 22 are not orthogonal with respect to each other. The present invention can be broadly characterized, however, in that 180° rotation (see angle φ in FIG. 1) of the rear polarizing element 20 about an in-plane axis of rotation 24 will result in a change between maximum transmission and minimum transmission of incident light, where the maximum and minimums are variable depending on the orientation of the axes of transmission 12 and 22 of the front and rear polarizers 10 and 20.

Perhaps even more broadly, it should be understood that at least one of the axes of transmission 12 and 22 is located at an angle that is greater than about 0 degrees and less than about 90 degrees, i.e., is not parallel with or orthogonal to the axis of rotation 24. As a result, the other polarizing element, regardless of the orientation of its transmission axis, will cross the other axis of transmission by a smaller angle in a first orientation and a larger angle when one of the polarizing elements is rotated about the axis of rotation to a second orientation. That variation between the first and second orientations, i.e., smaller and larger crossing angles, will change the amounts of incident light that are transmitted through the light valve. Where the axes of transmission cross at a smaller angle, the light valve will transmit more incident light and where the transmission axes cross at a larger angle, the light valve will transmit less incident light.

Figure 18A:
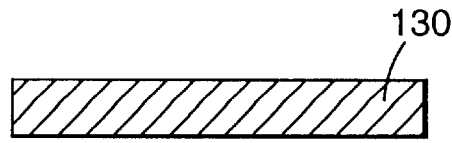
FIGS. 18a–18e are schematic cross-sectional views of illustrative polarizing. elements according to the present invention.

The polarizing elements in light valves according to the present invention may include only a single type of polarizing material or they may include combinations of two or more polarizing materials to achieve a desired optical effect. Turning to FIGS. 18a–18e, various combinations of polarizing elements are depicted in schematic cross-sectional views. FIG. 18a depicts a polarizing element including only a single layer 130 of polarizing material.

Figure 18B:
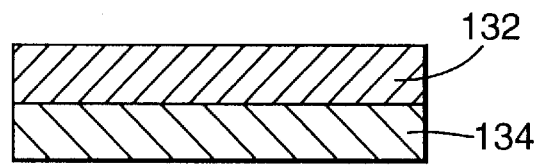

FIG. 18b depicts a polarizing element including two layers 132 and 134 of polarizing materials. For example, the two layers could include two layers of the same polarizing material. In another variation, the two layers could include a specularly reflective polarizing material 132 in combination with a diffusely reflective polarizing material 134.

Figure 18C:
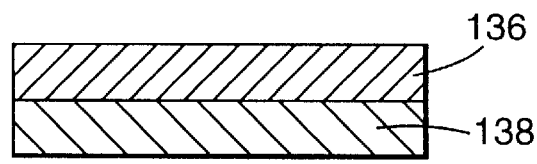

FIG. 18c depicts layer 136 of specularly reflective polarizing material and layer 138 of an absorptive polarizing material.

Figure 18D:
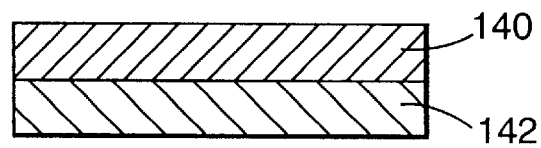

FIG. 18d depicts a layer 140 of diffusely reflective polarizing material and a layer 142 of an absorptive polarizing material.

Figure 18E:
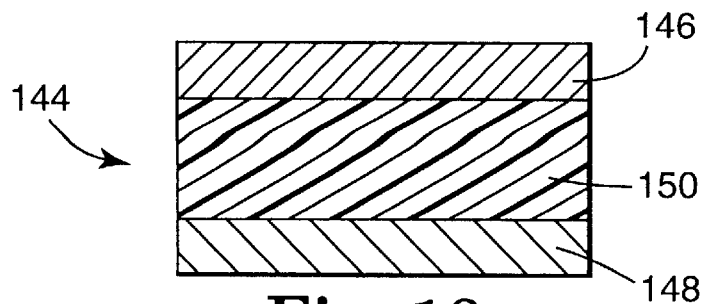

FIG. 18e is provided to indicate that, within a given polarizing element 144, two or more layers 146 and 148 of polarizing materials may be located on opposing sides of a core 150 to provide, e.g., additional rigidity or some other function to the polarizing element 144. In such an embodiment, it is preferred that the core 150 be substantially polarization preserving of the light passing through the core 150. It may also be preferred that the core 150 be substantially transparent to desired wavelengths of light. Furthermore, although only two layers of polarizing materials are depicted in combination, it will be understood that more than two layers of the same or different polarizing materials could also be used in polarizing elements of light valves according to the present invention.

It should also be understood that the light valves according to the present invention could be used in combination with other optical elements such as infrared reflective or absorptive materials, etc. These materials could be provided in addition to the light valves according to the present invention, or they could be incorporated into the light valves. For example, the core 150 of the polarizing element 144 could be an infrared absorptive or infrared reflective material. Alternatively, the layer 150 could be made of a polarizing material while layer 146 is infrared absorptive and layer 148 could be infrared reflective.

In general it is preferred, but not required that at least one of the preferred polarizing elements be constructed from reflective polarizing materials. As a result, wherever the light that is not transmitted through the polarizing elements is described as reflecting in the discussions regarding the polarizing elements, it should be understood that the reflected light could alternately be absorbed. In yet another variation, portions of the light that is described as reflected could be absorbed while other portions could be reflected.

Furthermore, although the polarizing elements according to the present invention are depicted in the illustrative embodiments as generally planar articles, it should be understood that the polarizing elements could take many other shapes. In all cases, however, the axis of transmission and the axis of rotation can be used to define a plane in which both axes are contained. In many cases the polarizing elements will include polarizing material that is supplied in film or sheet form.

Returning to FIG. 5, an alternate embodiment of a light valve according to the present invention is depicted including a plurality of polarizing elements 30a, 30b, 30c, 30d, and 30e (collectively referred to as polarizing elements 30). Each of the polarizing elements 30 is overlapped by one or more of the adjacent elements 30. For example, a portion of the polarizing element 30a is overlapped by polarizing element 30b which is, in turn, overlapped by the next polarizing element 30c.

Polarizing element 30c (which is shaded) along with the shaded portions of polarizing elements 30b and 30d preferably have transmission axes that are generally aligned with each other, while polarizing elements 30a and 30e (which are unshaded), as well as unshaded portions of polarizing elements 30b and 30d, have transmission axes that are generally aligned with each other. It is preferred that the two different sets of aligned axes of transmission (represented by the shaded and unshaded polarizing elements 30) be generally or substantially orthogonal to each other. As discussed above, however, the different sets of transmission axes need not necessarily be generally or substantially orthogonal as other orientations are also anticipated provided that at least some intersection or crossing of the two sets of axes of transmission can be accomplished by rotation of each of the polarizing elements 30 about their respective axes of rotation 40a, 40b, 40c, 40d, and 40e (collectively referred to as axes of rotation 40).

Figure 5:
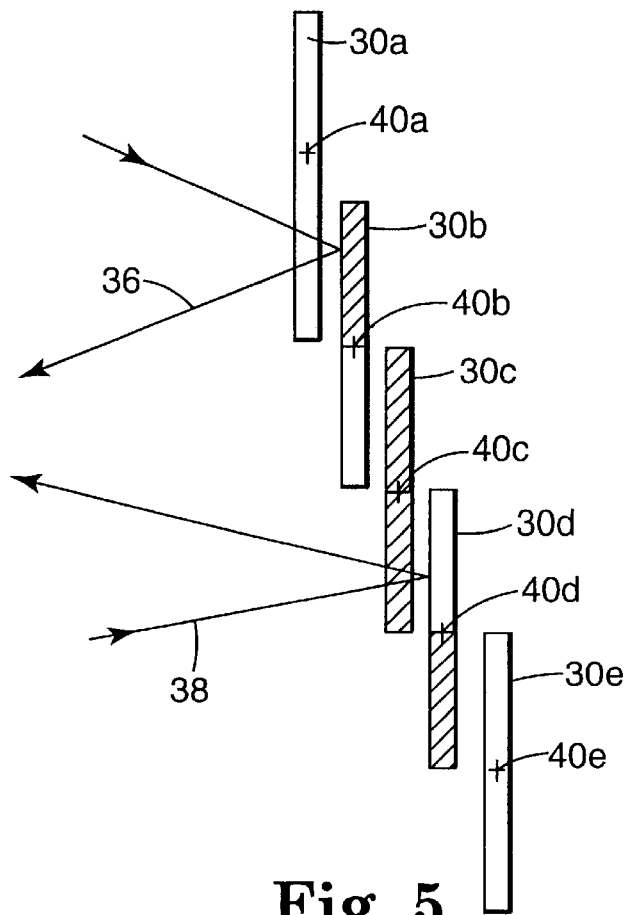
FIG. 5 is a side view of an alternative light valve according to the present invention.

When the polarizing elements 30 are aligned as depicted in FIG. 5, the light valve is in a substantially closed position, i.e., substantially all of the incident light is reflected from the light valve. For the purposes of this illustration, the polarizing elements 30 are preferably constructed from reflective polarizing materials and, as a result, light that is not transmitted is generally reflected from the polarizing elements 30. If, however, the elements 30 were absorptive polarizers rather than reflective, then the light that is not transmitted would generally be absorbed.

Among the incident light illustrated in FIG. 5, ray 36 has a polarization orientation that is transmitted through unshaded polarizing element 30a but is reflected, i.e., not transmitted, through the shaded overlapping portion of polarizing element 30b. Ray 38 is shown as incident upon polarizing element 30c and has a polarization orientation that is orthogonal to the polarization orientation of ray 36. As a result, ray 38 is transmitted through the shaded polarizing element 30c but is reflected from the unshaded portion of polarizing element 30d.

Figure 6:
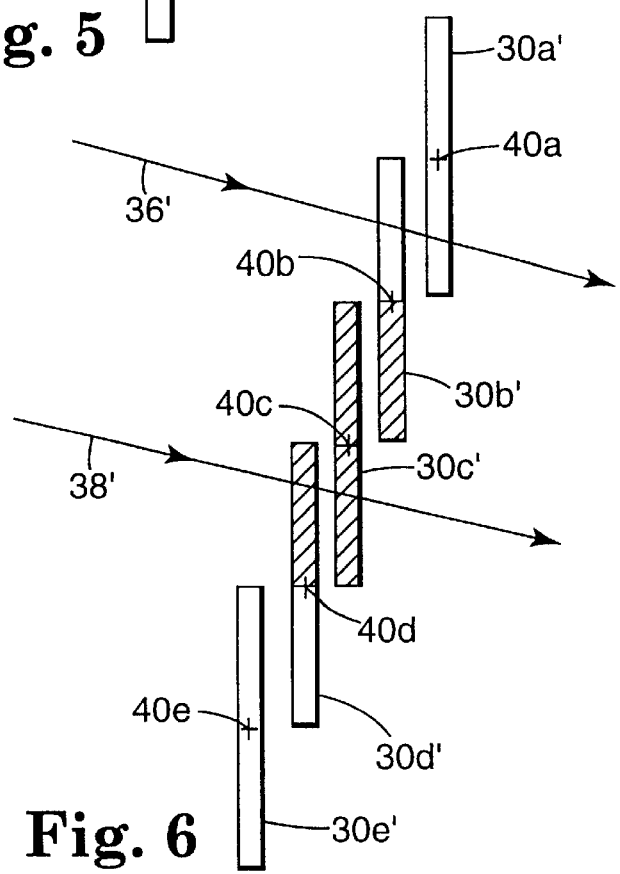
FIG. 6 is a side view of the light valve of FIG. 5 in which the elements 30 have been rotated 180° around their respective axes 40.

Rotation of each of the polarizing elements 30 about 180 degrees around its respective axis of rotation 40 will result in the light valve depicted in FIG. 6 in which the unshaded portions of the rotated polarizing elements 30' are aligned with each other (i.e., overlap each other) while the shaded portions of polarizing elements 30' have axes of transmission that are also aligned with each other. The result of these alignments is that substantially all of the light valve will transmit at least a portion of the incident light. Those portions of the light valve in which the unshaded portions of the polarizing elements 30' are aligned will transmit substantially all of the incident light having a polarization orientation aligned with their axes of transmission. Similarly, those portions of the light valve in which the shaded portions of the polarizing elements 30' are aligned will transmit substantially all of the incident light having a polarization orientation aligned with their axes of transmission.

For example, light 36' having one polarization orientation is transmitted through the unshaded polarizing element 30a' and the unshaded overlapping portion of reflective polarizer 30b'. Light 38', having a different polarization orientation, is transmitted through the shaded polarizing element 30c' and the shaded overlapping portion of polarizing element 30d', as shown. As a result, the light valve depicted in FIG. 6 will transmit about 50% of incident light as the unshaded portions of the light valve will transmit light of one polarization orientation while the shaded portions of the light valve will transmit light having another polarization orientation.

A review of the light valve depicted in FIGS. 5 and 6 will show that polarizing elements 30a–30d can be used as a repeating set to cover a desired area. In other words, the polarizing element 30e would form the first polarizing element of the next set, i.e., would correspond to polarizing element 30a located at the top of the light valve depicted in FIGS. 5 and 6. These repeating sets of polarizing elements 30a–30d could be chained together to form a light valve having the desired dimensions.

One advantage of a light valve constructed according to FIGS. 5 and 6 is that the need for a fixed or stationary front polarizing element as described in connection with the embodiment illustrated in FIGS. 1–4 is eliminated, as each of the rotating polarizing elements 30 function as either a front or rear polarizer depending on their orientation relative to the overlapping portions of the polarizing elements 30.

FIGS. 7–10 depict an alternate embodiment of a light valve, according to the present invention, in which front polarizing elements 50a, 50b, and 50c (collectively referred to as front polarizing elements 50) are provided in conjunction with rear polarizing elements 60a and 60b (collectively referred to as rear polarizing elements 60). Each of the front polarizing elements 50 includes an axis of rotation 52a, 52b, and 52c, respectively (collectively referred to as axes of rotation 52), and each of the rear polarizing elements 60 includes an axis of rotation 62a and 62b, respectively (collectively referred to as axes of rotation 62). Each of the front polarizing elements 50 also includes an axis of transmission 54 that forms an angle δ with the respective axis of rotation 52 for the given front polarizing element 50. Each of the rear polarizing elements 60 defines an axis of transmission 64 which forms an included angle ε with the respective axis of rotation 62 for the given rear polarizing element 60.

It is preferred that the axes of rotation 52 are preferably generally parallel to each other. It is also preferred that the axes of rotation 62 of each of the rear polarizing element 60 are also generally parallel to each other. Furthermore, it is also preferred that axes of rotation 52 are generally parallel to axes of rotation 62, as depicted in FIGS. 8 and 9.

Figure 7:
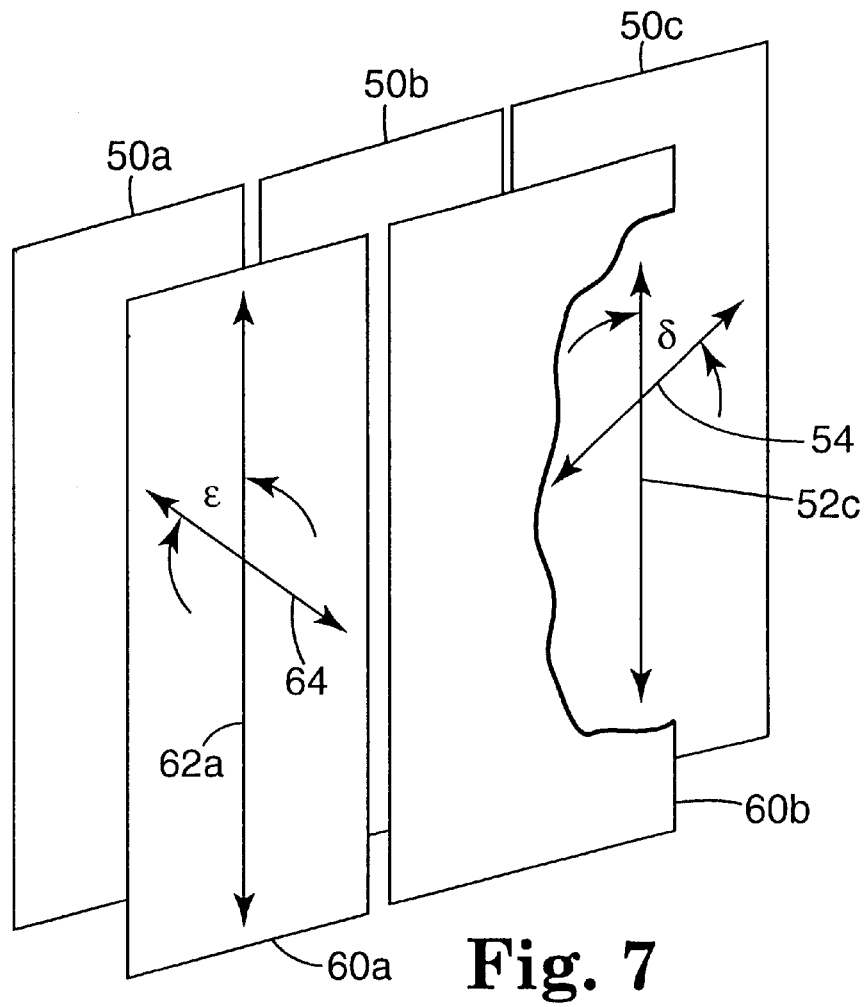
FIG. 7 is a perspective view of an alternate light valve according to the present invention.
Figure 8:
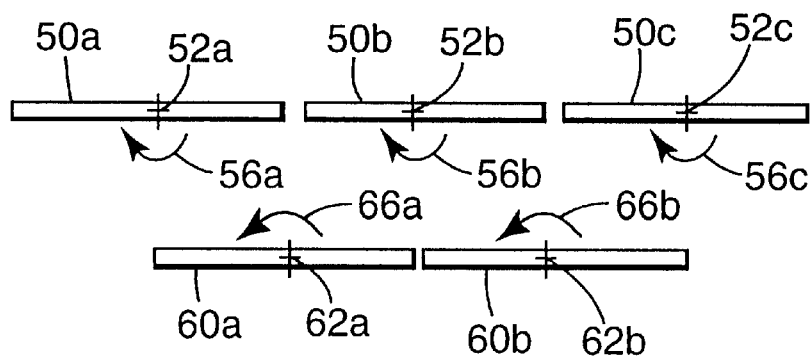
FIG. 8 is a top view of the light valve of FIG. 7 taken along the axes of rotation 52 and 62.
Figure 9:
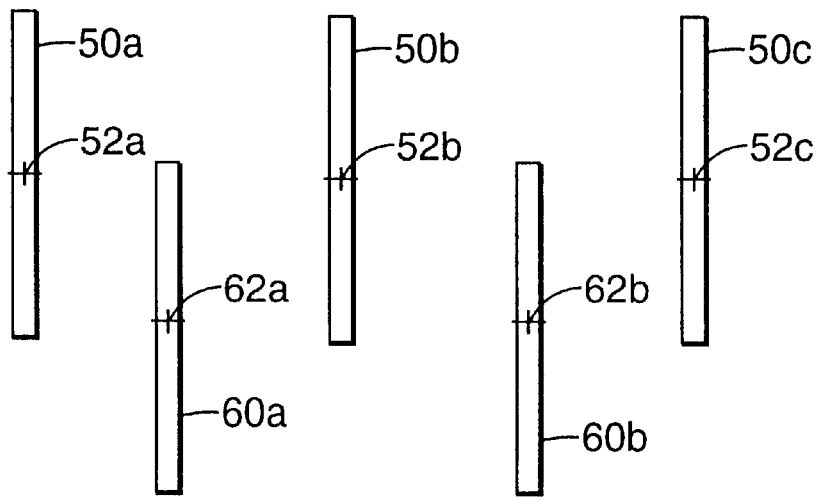
FIG. 9 is a top view of the light valve of FIG. 7 taken along the axes of rotation 52 and 62 after rotation of the elements 50 and 60 about their respective axes.
Figure 10:
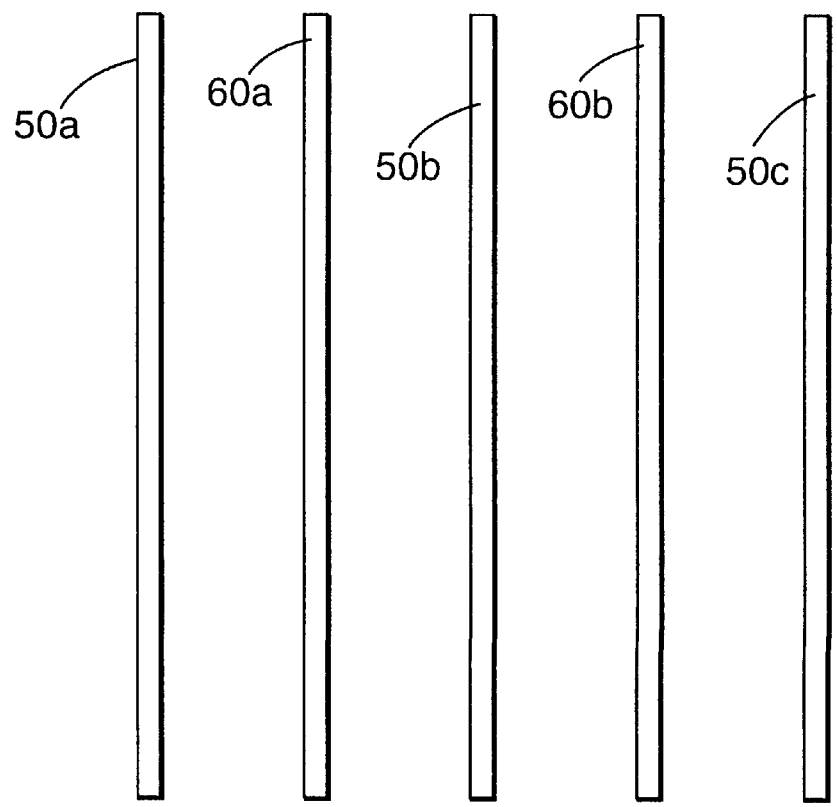
FIG. 10 is a front view of the light valve in the condition depicted in FIG. 9.

By rotating the front polarizing elements 50 and rear polarizing elements 60 about their respective axes of rotation, as shown by directional arrows 56a, 56b, 56c, 66a, and 66b, the polarizing elements 50 and 60 can be oriented in a substantially co-planar relationship, such as that depicted in FIGS. 7 and 8, or can be oriented in the generally parallel relationship best seen in FIGS. 9 and 10 where the polarizing elements 50 and 60 are all generally parallel to each other, thereby allowing at least a portion of light to pass through the light valve without passing through any of the polarizing elements 50 or 60.

Furthermore, where one of the angles δ or ε forms a 90° angle with the respective axes of rotation and the other of angles δ and ε is generally at about zero, i.e., the transmission axis is generally parallel to the respective axis of rotation, the front and rear polarizing elements 50 and 60 can be manipulated between a closed position and an open position. In the closed position, substantially none of the incident light would pass through both a front polarizing element 50 and a rear polarizing element 60. In the open position, at least some of the light would pass through the front and rear polarizers 50 and 60 only when one of the front or rear polarizer elements 50 and 60 were rotated 90° from the positions depicted in FIG. 8. In other words, if rear polarizing elements 60 were each rotated 90°, a substantial portion of the light passing through front polarizing elements 50 would pass between rear polarizing elements 60 and be transmitted through the light valve.

If, however, angles δ and ε were each approximately 45° off of their respective axes of rotation 52 and 62, then rotation of the front polarizing elements 50 and rear polarizing elements 60 can result in transmission of at least some incident light when the front and rear polarizing elements 50 and 60 are oriented in a generally co-planar relationship, as depicted in FIG. 8. For example, if front polarizing elements 50 were held stationary, as depicted in FIG. 7, while rear polarizing elements 60 were rotated about 180° around their respective axes of rotation 62, then the axes of transmission 54 and 64 would be generally aligned and would allow light having a polarization orientation substantially aligned with those axes of transmission to pass through the front polarizing elements 50 as well as the rear polarizing elements 60.

In contrast, the axes of transmission 54 and 64 would be generally orthogonal to each other if angles δ and ε are both approximately 45° and the rear polarizing elements 60 were rotated about 180° around their respective axes of rotation 62. As a result, light having one polarization orientation would be reflected by front polarizing elements 50, while light having the orthogonal polarization orientation would be reflected (or absorbed) by rear polarizing elements 60 resulting in the transmission of substantially no light through the light valve. It will be understood that the light could alternately be absorbed rather than reflected depending on the nature of the polarizing materials used in the polarizing elements.

Figure 11:
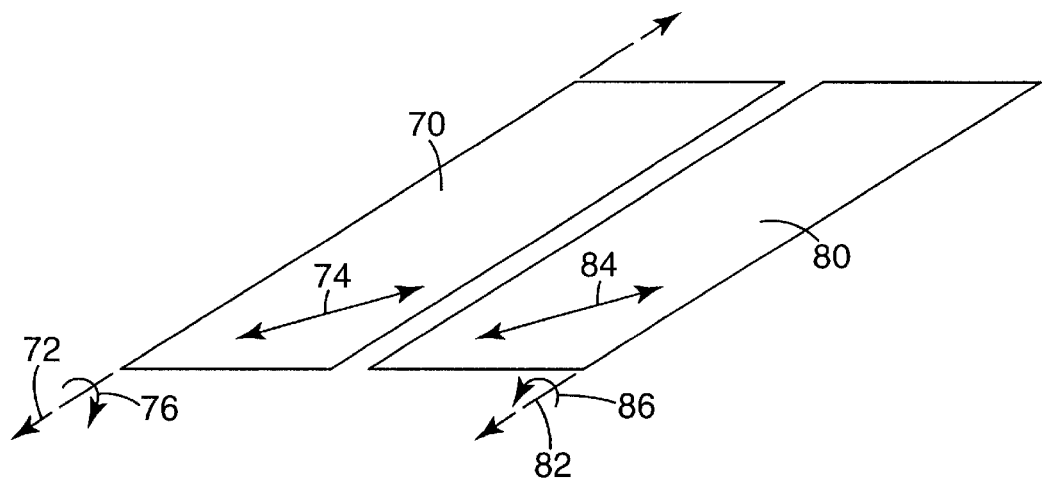
FIG. 11 is a perspective view of an alternate light valve according to the present invention.
Figure 12:
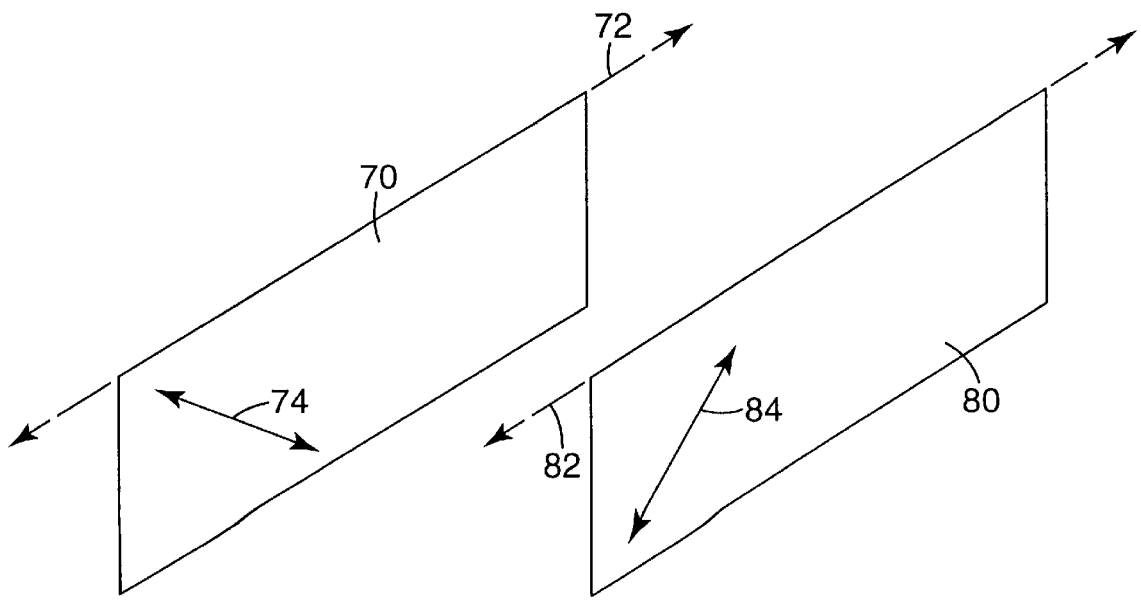
FIG. 12 is a perspective view of the light valve of FIG. 11 after rotation of the elements about their respective axes of rotation.

Another alternative light valve according to the present invention is depicted in FIGS. 11 and 12. The light valve includes polarizing elements 70 and 80. Polarizing element 70 rotates about an axis of rotation 72 and includes an axis of transmission 74 which defines the polarization orientation of light transmitted through polarizing element 70. Polarizing element 80 rotates about an axis of transmission 82 and includes a transmission axis 84 which also defines the polarization orientation of light transmitted through polarizing element 80.

When polarizing element 70 is rotated about axis of rotation 72 in direction 76 and polarizing element 80 is rotated about axis of rotation 82 in direction 86, the resulting orientation of the polarizing elements 70 and 80 is depicted in FIG. 12. In those light valves in which transmission axis 74 in polarizing element 70 is oriented at an angle of about 45° with axis of rotation 72 and in which axis of transmission 84 of polarizing element 80 is oriented at an angle of 45° with axis of rotation 82, the light valve of FIGS. 11 and 12 will block substantially all incident light directed through both polarizing element 70 and polarizing element 80 (assuming axes of rotation 72 and 82 are generally parallel to each other). Substantially all of the incident light is blocked when polarizing elements 70 and 80 are located in the orientation depicted in FIG. 12, because when the respective axes of transmission are oriented at about 45° with the respective axes of rotation, then the axis of transmission 74 is generally orthogonal to axis of transmission 84 when the polarizing elements 70 and 80 are in the orientation depicted in FIG. 12.

Figure 13:
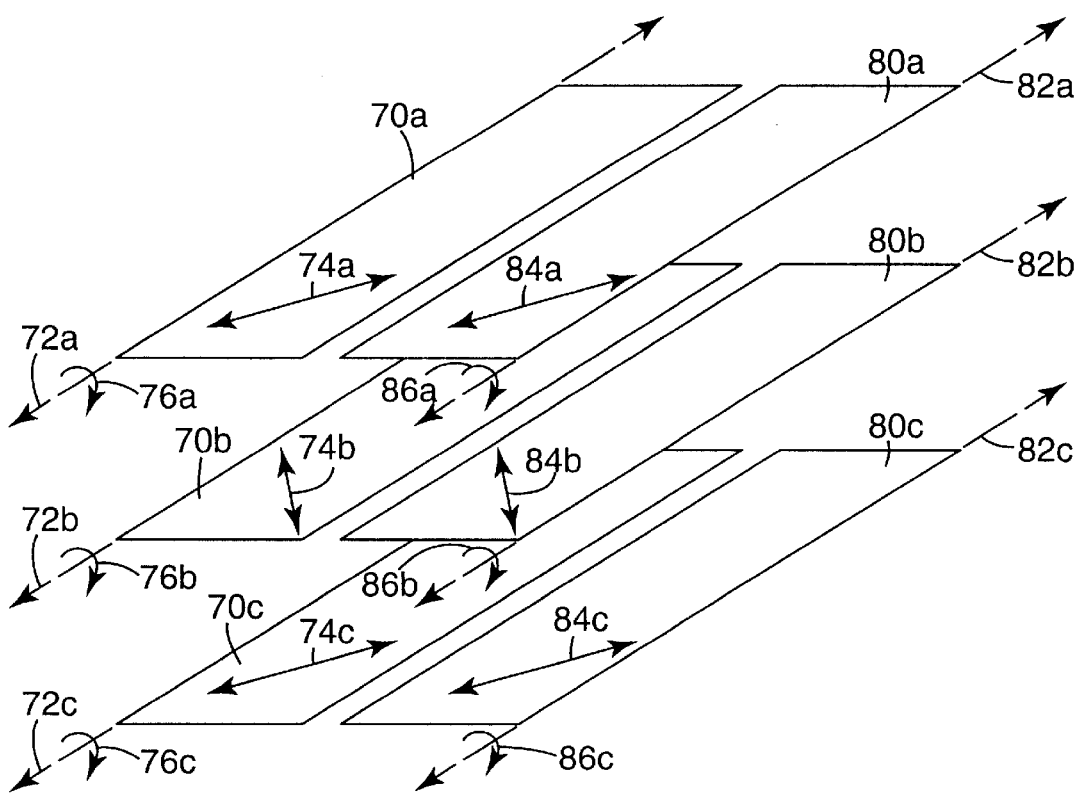
FIG. 13 is an alternate embodiment of a light valve according to the present invention.

FIG. 13 depicts an extension of the light valve of FIGS. 11 and 12 which includes a plurality of pairs of polarizing elements 70a/80a, 70b/80b, and 70c/80c. Each of the polarizing elements 70a, 70b, and 70c (collectively referred to as polarizing elements 70) is rotatable about an axis of rotation 72a, 72b, and 72c, respectively. The axes of rotation 72a, 72b, and 72c will be collectively referred to as axes of rotation 72. Similarly, each of the polarizing elements 80a, 80b, and 80c (collectively referred to as polarizing elements 80) is rotatable about an axis of rotation 82a, 82b, and 82c, respectively. The axes of rotation 82a, 82b, and 82c will be collectively referred to below as axes of rotation 82. Each of the polarizing elements 70 includes an axis of transmission 74a, 74b, and 74c (collectively referred to as axes of transmission 74). Likewise, each of the polarizing elements 80 includes an axis of transmission 84a, 84b, and 84c (collectively referred to as axes of transmission 84).

As with the light valve of FIGS. 11 and 12, it is preferred that each pair of polarizing elements 70 and 80 include respective axes of transmission 74 and 84, that are substantially aligned with each other and which form angles of 45° (or about 45°) with the respective axis of rotation 72 or 82. As a result, rotation of each of the polarizing elements 70 and 80 of about 90° around the axes of rotation 72 and 82 in the directions depicted by arrows 76 and 86 will result in orientation of the axes of transmission 74 and 84 in a generally orthogonal state where substantially all of the incident light will be prevented from passing through the light valve.

In the light valve depicted in FIG. 13, it is preferred that the axes of transmission 74 in polarizing elements 70 that are adjacent to each other (vertically in FIG. 13) be oriented generally orthogonal to each other. It is also preferred that each of the axes of rotation 72 of polarizing elements 70 be generally parallel to each other. As a result, the axis of transmission 74a for polarizing element 70a is preferably oriented generally orthogonal to the axis of transmission 74b of polarizing element 70b (when viewing down through the stack of polarizing elements 70). Likewise, it is preferred that axis of transmission 74b be oriented generally orthogonal to axis of transmission 74c for polarizing element 70c. The same relationships also are preferably present in the axes of transmission for polarizing elements 80 as depicted in FIG. 13.

Figure 14:
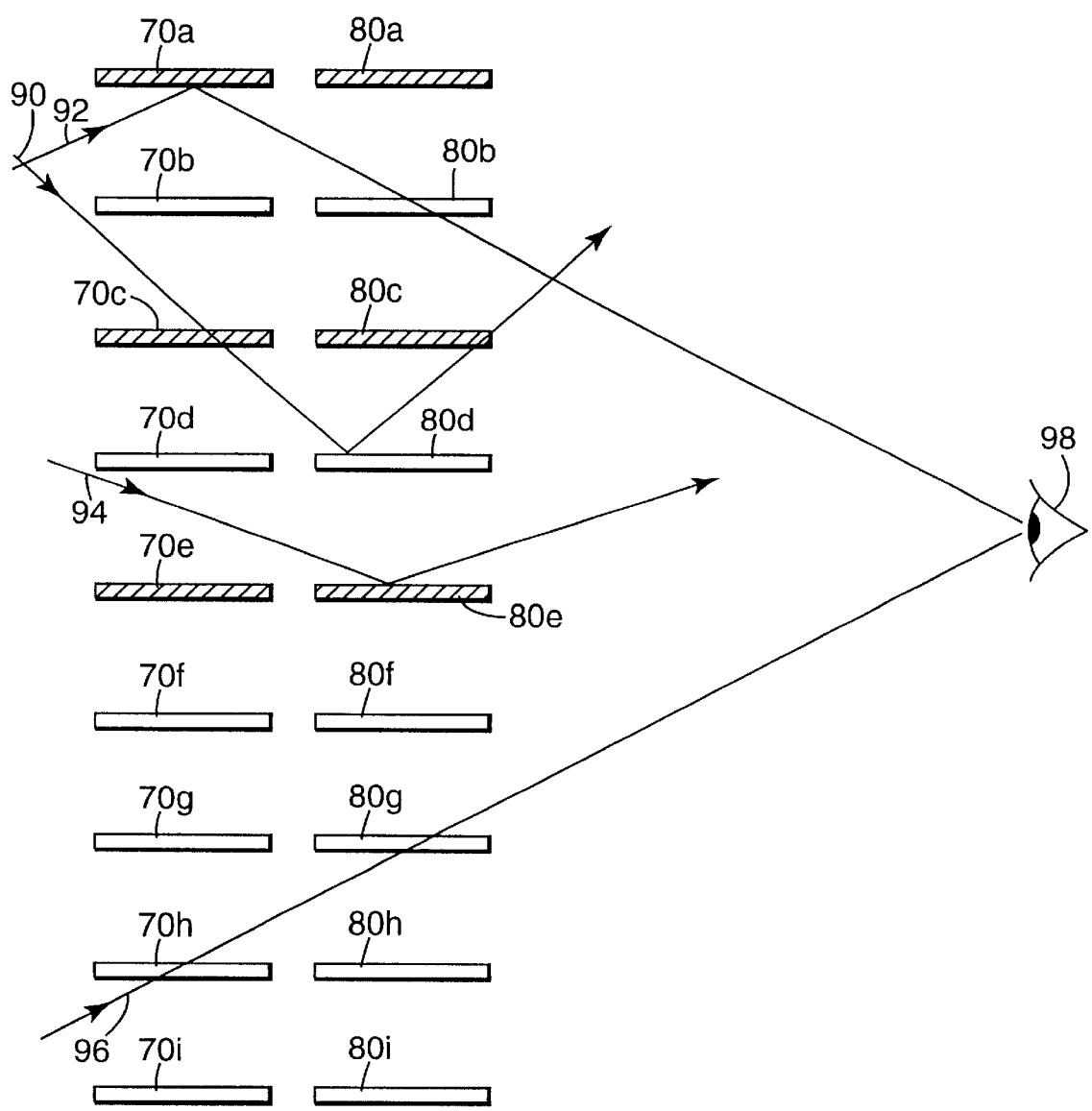
FIG. 14 is a side view of the light valve of FIG. 13, including additional elements 70 and 80 and taken along the axes of rotation 72 and 82 of the elements 70 and 80.

One potential advantage for light valves similar to those depicted in FIG. 13 is illustrated in FIG. 14 which, in addition to polarizing element pairs 70a/80a, 70b/80b, and 70c/80c, includes additional pairs of polarizing elements 70d/80d, 70e/80e, 70f/80f, 70g/80g, 70h/80h, and 70i/80i. Those polarizing elements 70 and 80 having an axis of transmission generally aligned with the axes of transmission 74a and 84a of FIG. 13 are depicted as shaded polarizing elements in FIG. 14. Those polarizing elements 70 and 80 having axes of transmission that are generally aligned with axes of transmission 74b and 84b, as depicted in FIG. 13, are unshaded in FIG. 14. In other words, polarizing elements 70b/80b, 70d/80d, and 70f/80f through 70i/80i all have axes of transmission that would be generally aligned with axes of transmission 74b and 84b of FIG. 13.

As depicted in FIG. 14, light that is incident upon the array of polarizing elements 70 and 80 at larger angles (with respect to the planes formed by each of the transmission axes and respective axes of rotation) will be reflected at least once by the polarizing elements 70 and 80 where the axes of transmission of vertically adjacent polarizing elements (e.g., 70a and 70b) are generally orthogonal to each other.

In other words, light 90, which has a polarization orientation that is transmitted by shaded polarizing element 70c, will be reflected by unshaded polarizing element 80d, as shown in FIG. 14. Similarly, light 92, which has a polarization orientation that is not transmitted by shaded polarizing element 70a, is transmitted by polarization orientation of unshaded polarizing element 80b and, as a result, is visible by an observer 98. Likewise, light 94, which has a polarization orientation that is not transmitted by shaded polarizing element 80e, would be reflected from that element and it would be allowed to enter into the area occupied by observer 98. The end effect of alternating axes of transmission between adjacent pairs of polarizing element 70 and 80 is that the view of an observer 98 upwards would be restricted where the path of light would pass through two polarizing elements having orthogonal axes of transmission, e.g., 70a and 80b. The actual angles at which the view of the observer 98 would be obstructed would vary on the spacing and size of the polarizing elements 70 and 80.

In the lower section of the light valve of FIG. 14, the axes of transmission of each pair of polarizing elements 70 and 80 is aligned such that the view of an observer 98 would not be restricted, and light represented by ray 96 from the lower portion or quadrant would be visible.

It will be understood that the use of alternating axes of transmission in a light valve similar to that depicted in FIG. 13 can be manipulated to allow for viewing in a desired quadrant or allow a view to be blocked as desired. For the light valve depicted in FIG. 14, the observer 98 has a view that is blocked in the upward direction but not in the lower direction. It will be understood that the alternative could be provided, i.e., the observer's view could be blocked in the downward direction as opposed to the upward direction. Furthermore, the view of the observer 98 could be blocked to a narrow range of angles by providing a light valve in which all of the polarizing elements were arranged as elements 70a/80a through 70f/80f, i.e., in which vertically adjacent polarizing elements have orthogonal axes of transmission.

Figure 19:
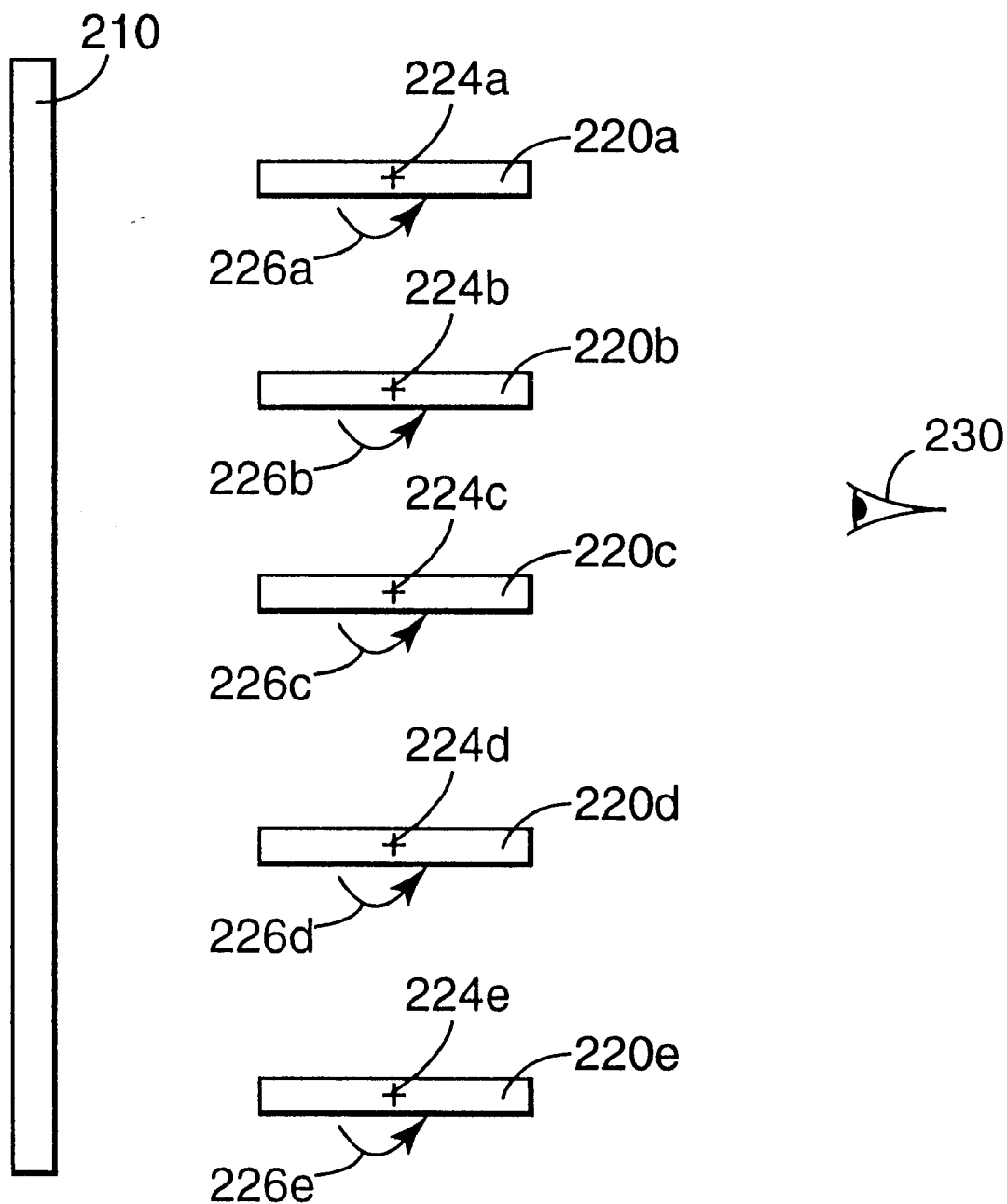
FIG. 19 is a side view of an alternate light valve according to the present invention.

In yet another variation, the same effects of restricting the view of an observer 230 is depicted in FIG. 19. Although similar to the light valve of FIGS. 1–4 which depict a fixed or stationary polarizing element in combination with a rotating polarizing element that rotates between two orientations that are preferably 180 degrees apart, FIG. 19 illustrates a light valve in which the rear polarizing elements rotate more than 180 degrees. The light valve of FIG. 19 includes a fixed or stationary front polarizing element 210 and a plurality of rear polarizing elements 220a through 220e (collectively referred to as polarizing elements 220). Each of the rear polarizing elements 220 rotates about an in-plane axis of rotation 224 as indicated by arrow 226. It is preferred that the polarizing elements 220 are mounted such that they can rotate 360 degrees around the axis of rotation 224. It is also preferred that the transmission axes (not shown) of the front polarizing element 210 and the rear polarizing elements 220 form included angles of about 45 degrees with the axes of rotation 224.

One advantage of allowing 360 degree rotation of the rear polarizing elements 220 is that the view of an observer 230 can be limited in either the upward direction or the downward direction when the polarizing elements 220 are not coplanar with the front polarizing element 210, e.g., as shown in FIG. 19. Those variations in viewing range can be changed by rotation of the polarizing elements 220 such that the axes of transmission of the polarizing elements 210/220 cross or align when viewed by the observer 230.

Figure 15:
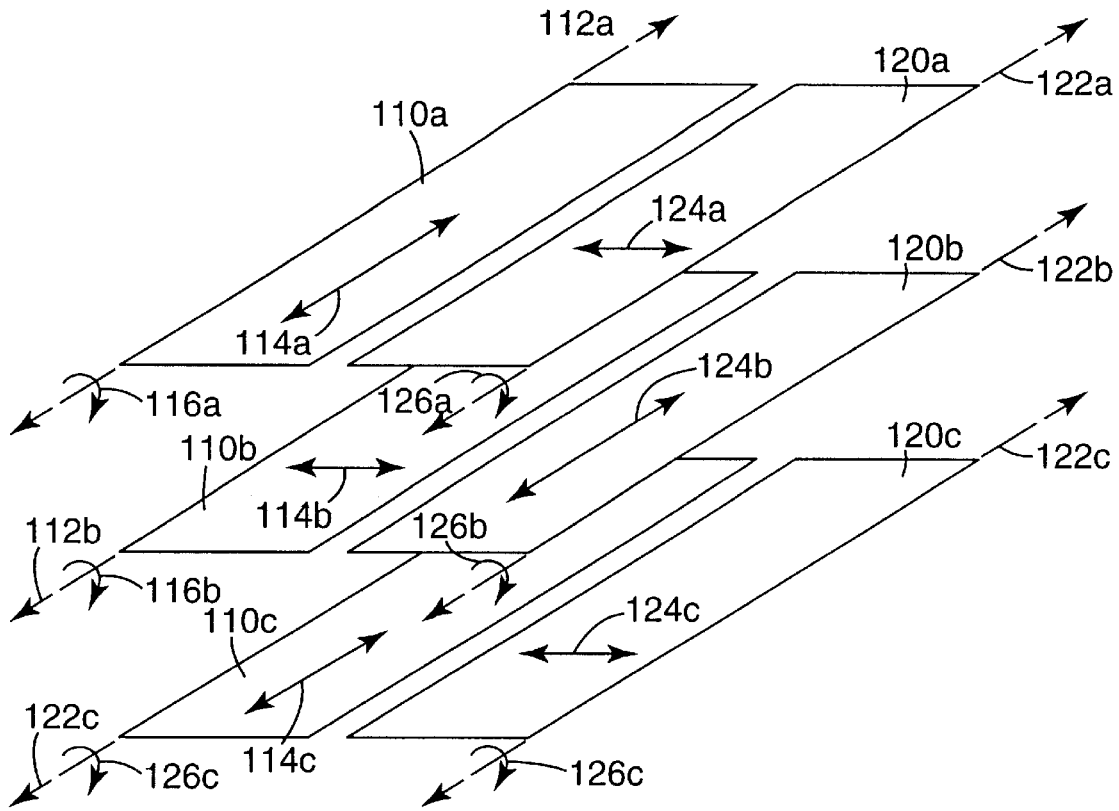
FIG. 15 is a perspective view of an alternate light valve according to the present invention.
Figure 16:
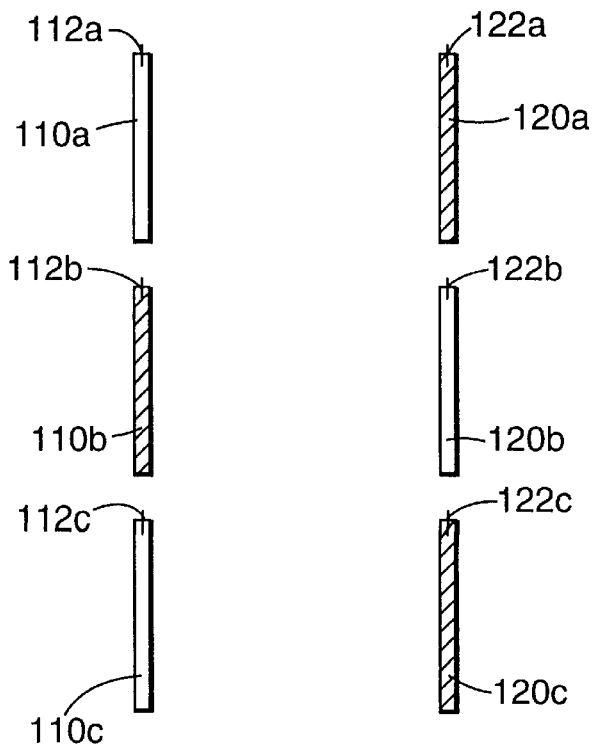
FIG. 16 is a side view of the light valve of FIG. 15 taken along the axes of rotation 112 and 122 of the elements 110 and 120.
Figure 17:
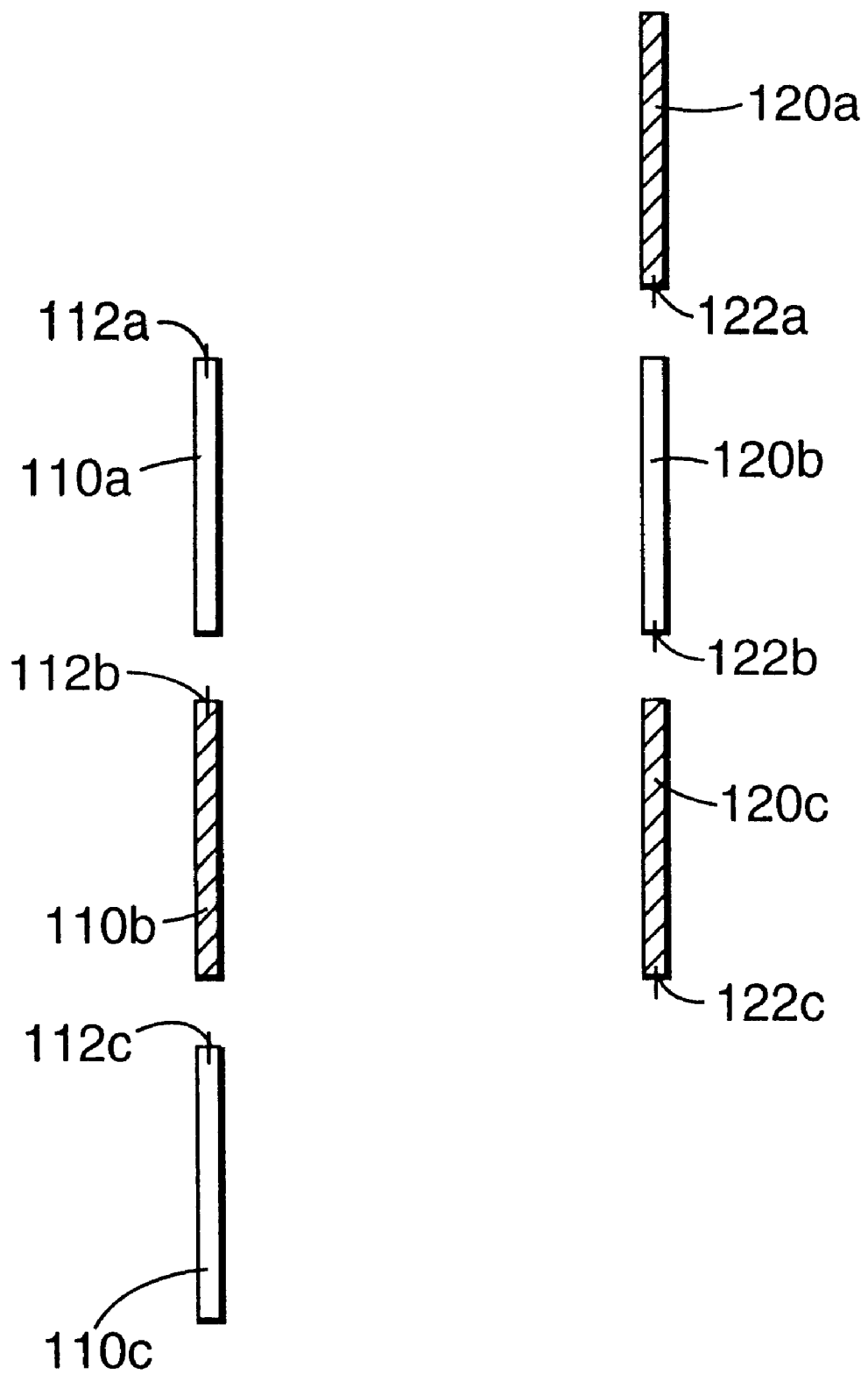
FIG. 17 is a side view of the light valve of FIG. 15 taken along the axes of rotation 112 and 122 of the elements 110 and 120, where elements 120 rotate opposite from the direction depicted in FIG. 15.

FIGS. 15–17 depict an alternate embodiment of a light valve according to the present invention which, although similar to the light valve of FIGS. 13 and 14, does include differences which affect its properties as described below. The light valve of FIG. 15 includes pairs of polarizing elements 110a/120a, 110b/120b, and 110c/120c (collectively referred to as polarizing elements 110 and polarizing elements 120). Each of the polarizing elements 110 rotates about an axis of rotation 112a, 112b, and 112c (collectively referred to as axes of rotation 112). That rotation is preferably in directions 116a, 116b, and 116c as depicted in FIG. 15. Similarly, each of the polarizing elements 120 rotates about its respective axis of rotation 122a, 122b, and 122c (collectively referred to as axes of rotation 122). The direction of rotation is preferably in the direction 126a, 126b, and 126c as depicted in FIG. 15.

In contrast to the light valve depicted in FIGS. 13 and 14, the light valve of FIG. 15 includes polarizing elements 110 and 120 that have axes of transmission that are either generally parallel or orthogonal to the axis of rotation f or the given polarizing element 110/120. For example, polarizing element 110a has an axis of transmission 114a that is preferably substantially parallel to axis of rotation 1116a. Polarizing element 120a preferably has an axis of transmission 124a that is generally orthogonal or transverse to axis of rotation 122a.

Moving vertically down the light valve, polarizing element 110b preferably has an axis of transmission 114b that is generally orthogonal or transverse to its axis of rotation 112b. Because the axes of rotation 112a and 112b are preferably generally parallel to each other, the axes of transmission 114a and 114b are generally orthogonal to each other.

Turning to polarizing element 120b, it preferably has an axis of transmission 124b that is generally parallel to its axis of rotation 122b. Because the axes of rotation 122a and 122b are preferably generally parallel to each other, axes of transmission 124a and 124b are preferably generally orthogonal or transverse to each other. The axes of transmission 114b/124b of polarizing element 110b and polarizing element 120b are also preferably generally transverse to each other and generally orthogonal to the axes of transmission 114a and 124a, respectively, of polarizing elements 110a and 120a.

Where the axes of transmission in each pair of polarizing elements 110/120 are oriented either parallel or orthogonal to the axes of rotation as depicted in FIG. 15, the light valve can be moved between a transmission state, such as that depicted in FIG. 15, to an opaque or blocking state, which is depicted in FIG. 16. That movement is typically effected by rotating each of the polarizing elements 110 about 90 degrees around their respective axes of rotation 112 in the directions indicated by arrows 116a–116c. Similarly, each of the polarizing elements 120 is rotated about 90 degrees around their respective axes of rotation 122 in the directions indicated by arrows 126a–126c.

In the end view of FIG. 16 taken along axes of rotation 112 and 122 of FIG. 15, it can be seen that after rotation each of the polarizing elements 110 is generally aligned or located in front of a polarizing element 120. Those polarizing elements 110/120 that have an axis of transmission generally orthogonal or transverse to its respective axis of rotation are depicted as shaded elements 110 and 120 in FIG. 16. Those polarizing elements 110/120 having axes of transmission generally parallel to their respective axes of rotation 112 and 122 are depicted as unshaded in FIG. 16.

The result of orienting the polarizing elements 110/120 as shown in FIG. 16 is that light having any given polarization orientation will be reflected by the polarizing elements 110/120 such that transmission through the light valve will generally be prevented regardless of the polarization orientation of the incident light.

FIG. 17 depicts the result of rotating each of the polarizing elements 120 about 90 degrees around their respective axes of rotation in the direction opposite to directions 126a–126c as indicated in FIG. 15. As with FIG. 16, the shaded polarizing elements 110/120 are those in which the axis of transmission is generally orthogonal or transverse to the axis of rotation for that polarizing element while the unshaded polarizing elements 110/120 are those in which the axis of transmission is generally parallel to the axis of rotation of that polarizing element.

The result of rotating polarizing elements 120 in a direction opposite to that indicated by arrows 126a–126c in FIG. 15 is general alignment of the axes of transmission between each pair of front and rear polarizing elements 110/120. The result is that, at least for normal light, the light valve will transmit approximately 50% of incident light (assuming such light has a random polarization orientation). In other words, light passing through polarizing element 110a, which has an axis of transmission that is generally parallel to axis of rotation 112, will also generally be transmitted through polarizing element 120b, which has an axis of transmission that is parallel to (or generally parallel to) its axis of rotation 122b (assuming that axis of rotation 112a is generally parallel to axis of rotation 122b). Similarly, light having a polarization orientation that is transmitted through polarizing element 110b will also be transmitted through polarizing element 120c assuming the axes of rotation 112b and 122c are generally parallel to each other.

Figure 20:
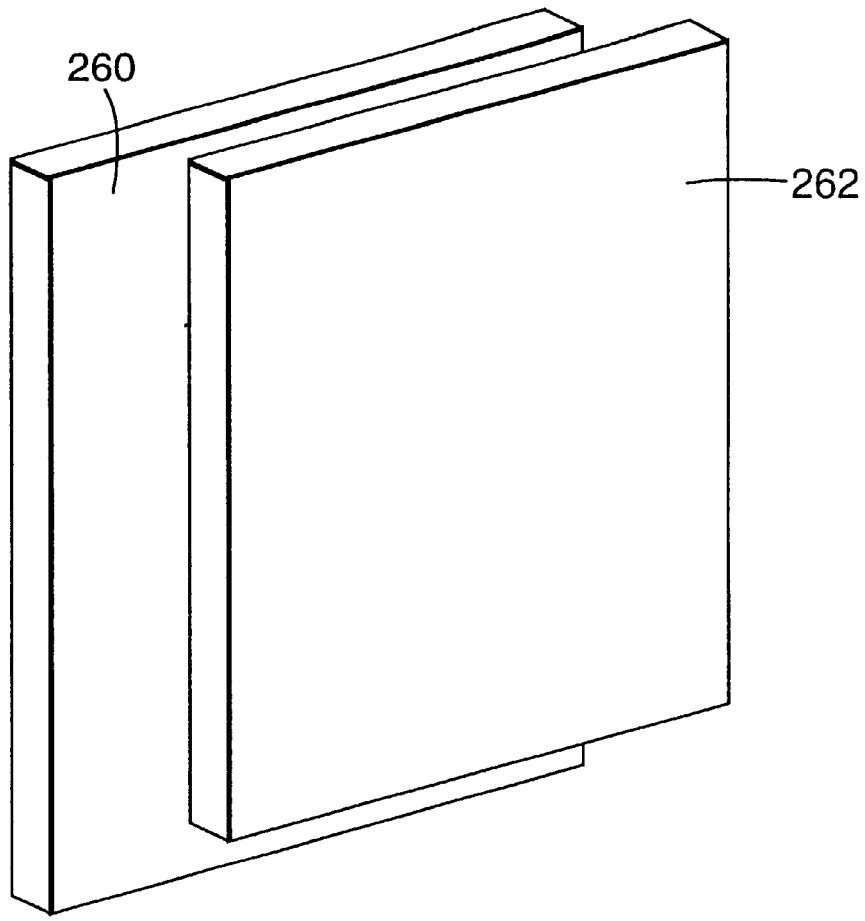
FIG. 20 is a schematic diagram of a window with a light valve according to the present invention.
Figure 21:
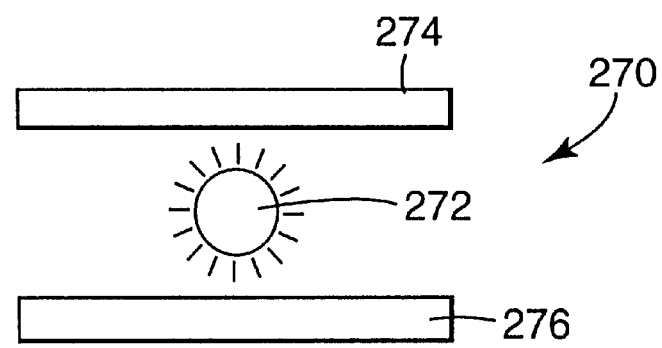
FIG. 21 is a schematic diagram of a luminaire including a light valve according to the present invention.
Figure 22:
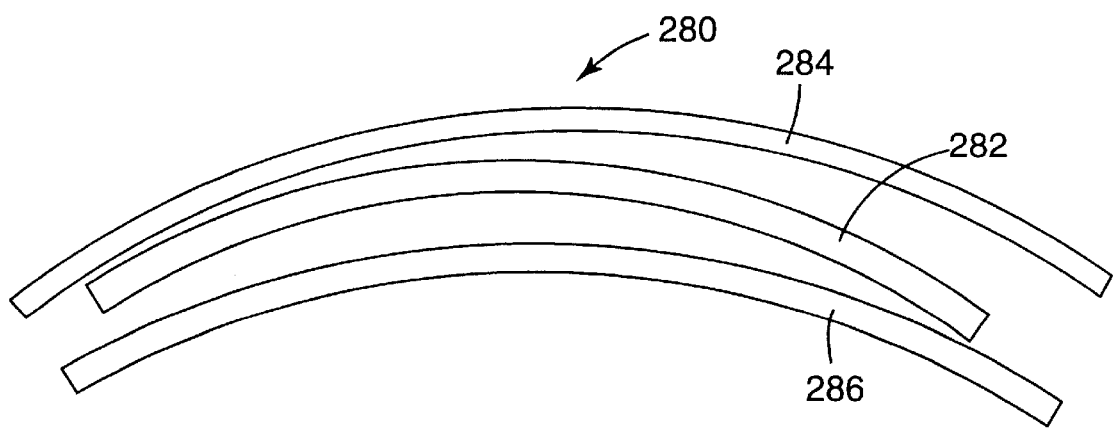
FIG. 22 is a schematic diagram of a skylight including a light valve according to the present invention.

The light valves according to the present invention may be used in many different applications to control the transmission of light. Some more specific examples are, however, depicted in FIGS. 20–22 (although it should be understood that other applications may also be envisioned). FIG. 20 depicts a window 260 including a light valve 262 according to the present invention. FIG. 21 depicts a luminaire 270 including a light source 272 and a pair of opposing light valves 274 and 276 constructed according to the present invention. FIG. 22 is a partial cross-sectional view of a skylight 280 including a light valve 282 located between two panes 284/286 of glass or another light transmissive material.

The patents, patent documents, and publications cited herein are incorporated by reference in their entirety, as if each were individually incorporated by reference. Various modifications and alterations of this invention will become apparent to those skilled in the art without departing from the scope of this invention. Accordingly, it is to be understood that this invention is not to be limited to the illustrative embodiments set forth herein, but is to be controlled by the limitations set forth in the following claims and any equivalents thereof.

What is claimed is:

1. A light valve comprising:
   a first polarizing element having a first transmission axis; and
   a second polarizing element having an axis of rotation and a second transmission axis intersecting the axis of rotation at a fixed angle of about 45 degrees;
   wherein rotation of the second polarizing element about the axis of rotation to a first orientation generally aligns the first and second transmission axes and rotation of the second polarizing element about the axis of rotation to a second orientation causes the first transmission axis to cross the second transmission axis, whereby transmission of light traveling through the first and second polarizing elements is reduced relative to the light transmitted through the first and second polarizing elements when in the first orientation.

2. A light valve according to claim 1, wherein the first transmission axis forms an angle of about 45 degrees with the axis of rotation of the second polarizing element.

3. A light valve according to claim 1, wherein the second polarizing element is rotated about 180 degrees around the axis of rotation when moving between the first and second orientations.

4. A light valve according to claim 1, wherein the first polarizing element is stationary relative to the axis of rotation of the second polarizing element.

5. A light valve according to claim 1, further comprising two or more second polarizing elements.

6. A light valve according to claim 1, wherein the first polarizing element comprises a reflective polarizer.

7. A light valve according to claim 1, wherein the second polarizing element comprises a reflective polarizer.

8. A light valve comprising:
   a first polarizing element comprising a reflective polarizer having a first transmission axis; and
   a plurality of second polarizing elements, each of the second polarizing elements including an axis of rotation about which the second polarizing element rotates and a reflective polarizer having a second transmission axis that forms a fixed angle of about 45 degrees with the axis of rotation of the second polarizing element, the axes of rotation of the plurality of second polarizing elements being generally parallel to each other;

wherein the first transmission axis of the first polarizing element forms an angle of about 45 degrees with the axes of rotation of the plurality of second polarizing elements, and further wherein rotation of each of the second polarizing elements about its respective axis of rotation to a first orientation generally aligns the second transmission axis of the second polarizing element with the first transmission axis, and further wherein rotation of each of the second polarizing elements about 180 degrees around its respective axis of rotation to a second orientation causes the second transmission axis to cross the first transmission axis, whereby transmission of light traveling through the first and second polarizing elements is reduced relative to the light transmitted through the first and second polarizing elements when in the first orientation.

9. A light valve comprising:

a first polarizing element having a first axis of transmission and a first axis of rotation, wherein the first axis of transmission and the first axis of rotation define a first plane for the first polarizing element; and a second polarizing element having a second axis of transmission and a second axis of rotation, wherein the second axis of transmission and the second axis of rotation define a second plane for the second polarizing element, and further wherein at least a portion of the second polarizing element overlaps at least a portion of the first polarizing element;

wherein the first and second transmission axes of the first and second polarizing elements are generally aligned in a first orientation, and further wherein rotation of the first and second polarizing elements about their respective axes of rotation to a second orientation causes the second transmission axis to cross the first transmission axis, whereby transmission of light traveling through the first and second polarizing elements is reduced relative to the light transmitted through the first and second polarizing elements when in the first orientation.

10. A light valve according to claim 9, wherein the first polarizing element is rotated about 180 degrees clockwise around the first axis of rotation and the second polarizing element is rotated about 180 degrees counterclockwise around the second axis of rotation when moving between the first and second orientations.

11. A light valve according to claim 9, wherein the first and second axes of rotation are generally parallel to each other.

12. A light valve according to claim 9, wherein the first transmission axis forms an angle of about 45 degrees with the first axis of rotation.

13. A light valve according to claim 12, wherein the second transmission axis forms an angle of about 45 degrees with the second axis of rotation.

14. A light valve according to claim 9, wherein the first transmission axis is generally parallel to the first axis of rotation.

15. A light valve according to claim 14, wherein the second transmission axis is generally orthogonal to the second axis of rotation.

16. A light valve comprising:

a plurality of polarizing elements, at least a portion of each of the polarizing elements having a first transmission axis or a second transmission axis, wherein the portions of the polarizing elements having the first transmission axis transmit a substantial portion of light having a first polarization orientation and the portions of the polarizing elements having the second transmission axis transmit a substantial portion of light having a second polarization orientation, the plurality of polarizing elements including:

a first polarizing element having the first axis of transmission and a first axis of rotation, wherein the first axis of transmission in the first polarizing element intersects the first axis of rotation;

a second polarizing element including an upper segment having the first transmission axis, a lower segment having the second transmission axis, and a second axis of rotation, wherein the first and second transmission axes in the second polarizing element intersect the second axis of rotation and each other, and further wherein at least a portion of the second polarizing element overlaps at least a portion of the first polarizing element;

a third polarizing element having the first axis of transmission and a third axis of rotation, wherein the first axis of transmission in the third polarizing element intersects the third axis of rotation, and further wherein at least a portion of the third polarizing element overlaps at least a portion of the second polarizing element; and a fourth polarizing element including an upper segment having the first transmission axis, a lower segment having the second transmission axis, and a fourth axis of rotation, wherein the first and second transmission axes in the fourth polarizing element intersect the fourth axis of rotation and each other, and further wherein at least a portion of the fourth polarizing element overlaps at least a portion of the third polarizing element;

wherein rotation of the first, second, third, and fourth polarizing elements about their respective axes of rotation to a first orientation generally aligns the first and second transmission axes in each of the overlapping portions of the first, second, third, and fourth polarizing elements, and further wherein rotation of the first, second, third, and fourth polarizing elements about their respective axes of rotation to a second orientation causes the first and second transmission axes in each of the overlapping portions of the first, second, third, and fourth polarizing elements to cross, whereby transmission of light traveling through the first, second, third, and fourth polarizing elements when in the second orientation is reduced relative to the light transmitted through the first, second, third, and fourth polarizing elements when in the first orientation.

17. A light valve according to claim 16, wherein the first, second, third and fourth axes of rotation are generally parallel to each other.

18. A light valve according to claim 17, wherein the first transmission axis in each of the first, second, third, and fourth polarizing elements forms an angle of about 45 degrees with the first, second, third and fourth axes of rotation in each of the first, second, third, and fourth polarizing elements.

19. A light valve according to claim 18, wherein the second transmission axis in each of the first, second, third, and fourth polarizing elements forms an angle of about 45 degrees with the first, second, third and fourth axes of rotation in each of the first, second, third, and fourth polarizing elements.

20. A light valve according to claim 17, wherein the first transmission axis in each of the first, second, third, and fourth polarizing elements is generally parallel to each of the first, second, third and fourth axes of rotation in each of the first, second, third, and fourth polarizing elements.

21. A light valve according to claim 20, wherein the second transmission axis in each of the first, second, third, and fourth polarizing elements is generally orthogonal to each of the first, second, third and fourth axes of rotation in each of the first, second, third, and fourth polarizing elements.

22. A light valve according to claim 8, wherein the first polarizing element comprises a continuous sheet, and further wherein the plurality of second polarizing elements are located in an array proximate one surface of the first polarizing element.

* * * * *